United States Patent
Liu et al.

(10) Patent No.: US 11,432,244 B2
(45) Date of Patent: Aug. 30, 2022

(54) METHOD AND DEVICE FOR DETERMINING POWER CONTROL CONFIGURATION

(71) Applicant: Telefonaktiebolaget LM Ericsson (publ), Stockholm (SE)

(72) Inventors: Jinhua Liu, Beijing (CN); Rui Fan, Beijing (CN); Hai Wang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 156 days.

(21) Appl. No.: 16/494,361

(22) PCT Filed: Mar. 9, 2018

(86) PCT No.: PCT/CN2018/078568
§ 371 (c)(1),
(2) Date: Sep. 16, 2019

(87) PCT Pub. No.: WO2018/171443
PCT Pub. Date: Sep. 27, 2018

(65) Prior Publication Data
US 2021/0410074 A1    Dec. 30, 2021

(30) Foreign Application Priority Data
Mar. 24, 2017  (WO) ................ PCT/CN2017/078085

(51) Int. Cl.
*H04W 76/38*    (2018.01)
*H04W 52/14*    (2009.01)
(Continued)

(52) U.S. Cl.
CPC ......... *H04W 52/146* (2013.01); *H04W 52/08* (2013.01); *H04W 52/10* (2013.01); *H04W 72/1263* (2013.01); *H04W 72/14* (2013.01)

(58) Field of Classification Search
CPC ..... H04W 52/32; H04W 52/08; H04W 52/38; H04W 52/54; H04W 52/10; H04W 52/18; H04W 52/06
See application file for complete search history.

(56) References Cited

U.S. PATENT DOCUMENTS 10,327,208 B2 * 6/2019  Jeong ................ H04W 52/0258
10,506,603 B2 * 12/2019  Yerramalli ........ H04W 72/0473
(Continued)

FOREIGN PATENT DOCUMENTS

CN    101202572 A    6/2008
CN    101242203 A    8/2008
(Continued)

OTHER PUBLICATIONS

International Search Report and Written Opinion of the International Searching Authority, PCT/CN2018/078568, dated May 29, 2018, 9 pages.
(Continued)

*Primary Examiner* — Tu X Nguyen
(74) *Attorney, Agent, or Firm* — Sage Patent Group

(57) ABSTRACT

A method and device for determining power control configuration. it is determined whether a first transmit power control configuration based on a first uplink transmission is outdated; and a second transmit power control configuration for a second uplink transmission is determined based on a power control scheme. Therefore, transmit power control efficiency of sparse data transmissions may be improved.

13 Claims, 5 Drawing Sheets

(51) Int. Cl.
*H04W 52/08* (2009.01)
*H04W 52/10* (2009.01)
*H04W 72/12* (2009.01)
*H04W 72/14* (2009.01)

(56) References Cited

U.S. PATENT DOCUMENTS

| | | |
|---|---|---|
| 2009/0117931 A1 | 5/2009 | Shin et al. |
| 2010/0067496 A1* | 3/2010 | Choi .................. H04W 52/54 370/336 |
| 2010/0179702 A1 | 7/2010 | Guo et al. |
| 2014/0247796 A1 | 9/2014 | Ouchi et al. |
| 2014/0269454 A1 | 9/2014 | Papasakellariou |
| 2016/0014834 A1 | 1/2016 | Chang et al. |

FOREIGN PATENT DOCUMENTS

| | | |
|---|---|---|
| CN | 101640558 A | 2/2010 |
| CN | 101877905 A | 11/2010 |
| EP | 2685631 A2 | 1/2014 |

OTHER PUBLICATIONS

Sharp, "Discussion on a timing issue on UL TPC for LAA SCell", 3GPP TSG RAN WG1 Meeting #87 R1-1612614, Nov. 18, 2016, pp. 1-7.
European Search Report for EP Application No. 18770552 dated Jan. 24, 2020, 9 Pages.
Office Action for Japanese Patent Application No. 201880019661.5, dated Feb. 25, 2022, 10 pages.

\* cited by examiner

METHOD AND DEVICE FOR DETERMINING POWER CONTROL CONFIGURATION

CROSS-REFERENCE TO RELATED APPLICATION

This application is a 35 U.S.C. § 371 national stage application of PCT International Application No. PCT/CN2018/078568 filed on Mar. 9, 2018, which in turns claims foreign priority to PCT International Application No. PCT/CN2017/078085, filed on Mar. 24, 2017, the disclosures and content of which are incorporated by reference herein in their entirety.

TECHNICAL FIELD

Embodiments of the present disclosure generally relate to the field of communications, and more particularly, to a method and device for determining power control configuration.

BACKGROUND

This section introduces aspects that may facilitate better understanding of the present disclosure. Accordingly, the statements of this section are to be read in this light and are not to be understood as admissions about what is in the prior art or what is not in the prior art.

In long term evolution (LTE), uplink power control is used to compensate for channel path loss variations. When there is high attenuation between a user equipment (UE) and a base station, the UE increases its transmit power in order to maintain a received power at the base station at a desirable level.

The transmitter power of the UE for different type of channels follow different power control rules. If the UE transmits a physical uplink shared channel (PUSCH) without a simultaneous physical uplink control channel (PUCCH) for a serving cell c, then the UE transmits data with power $P_{PUSCH,c}(i)$ for PUSCH transmission in a subframe i) for the serving cell c, the following formula may be adopted according to some documents, such as 3GPP ($3^{rd}$ generation partner project) TS (technical specification) 36.213-c100.

$$P_{PUSCH,c}(i) = \min \begin{cases} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{cases}$$

[dBm]

Wherein, $P_{CMAX,c}$ is the configured UE transmitting power; $M_{PUSCH,c}(i)$ is a bandwidth of the PUSCH resource assignment expressed in number of resource blocks valid for the subframe i and the serving cell c; $P_{O\_PUSCH,c}(j)$ is a parameter composed of the sum of a component $P_{O\_NOMINAL\_PUSCH,c}(j)$ provided from higher layers for j=0 and 1 and a component $P_{O\_UE\_PUSCH,c}(j)$ provided by higher layers for j=0 and 1 for serving cell c; $\alpha_c \in \{0, 0.4, 0.5, 0.6, 0.7, 0.8, 0.9, 1\}$ is a 3-bit parameter provided by higher layers for serving cell c; $PL_c$ is a downlink path-loss estimation value calculated in the UE for serving cell c in dB; $\Delta_{TF,c}$ is a dynamic offset given by higher layers; $f_c(i)$ is a function (may also be referred to as a power control configuration or a power control parameter, and so on) that represents accumulation of transmit power control (TPC) commands.

If accumulation is enabled based on a parameter Accumulation-enabled provided by higher layers or if the TPC command $\delta_{PUSCH,c}$ is included in a PDCCH/EPDCCH (enhanced PDCCH) with DCI (downlink control information) format 0 for serving cell c where a cyclic redundancy check (CRC) is scrambled by a C-RNTI (cell radio network temporary identifier), then $f_c(i)=f_c(i-1)+\delta_{PUSCH,c}(i-K_{PUSCH})$.

If accumulation is not enabled for serving cell c based on the parameter Accumulation-enabled provided by higher layers, then $f_c(i)=\delta_{PUSCH,c}(i-K_{PUSCH})$.

$\delta_{PUSCH,c}$ is a correction value, also referred to as a TPC command and is included in PDCCH/EPDCCH with DCI format 0/4 for serving cell c or jointly coded with other TPC commands in PDCCH with DCI format 3/3A whose CRC parity bits are scrambled with TPC-PUSCH-RNTI.

For PUSCH (re)transmissions corresponding to a semi-persistent grant then j=0, for PUSCH (re) transmissions corresponding to a dynamic scheduled grant then j=1 and for PUSCH (re)transmissions corresponding to a random access response grant then j=2.

From the above description, TPC command accumulation may be either enabled or disabled by network. If the TPC command accumulation is enabled, the UE shall determine $f_c(i)$ by accumulating the previously received TPC commands together and the current received TPC command Otherwise, if the TPC command accumulation is disabled, the UE shall determine $f_c(i)$ based on the current received TPC command only. For the two schemes, the TPC command generation and transmission methods are different.

For the accumulation-enabled scheme (may be referred to as scheme 1), relative TPC commands (i.e. indication of a relative increase or decrease) is generated. It is feasible when there is frequent data transmission using radio link so that frequent TPC commands can be generated. In the UE side, the transmit power can be adjusted frequently and it can be expected that the transmit power can match variance of radio channel. Scheme 1 may use a small TPC field since only the relative power change is indicated.

For the accumulation-disabled scheme (may be referred to as scheme 2), an absolute power adjustment value shall be indicated via the TPC command so that the UE can determine the proper transmit power based on only the most recently received TPC command. It is feasible there is only intermittent data transmission. Scheme 2 may require a large TPC field since the absolute power adjustment is indicated.

When there is frequent data transmission, scheme 1 is expected to outperform scheme 2 due to possible measurement inaccuracy for TPC generation and TPC transmission error is filtered out by accumulating the previous TPC commands.

For scheme 2, it is more feasible for intermittent data transmission for which the TPC is too sparse and the required power adjustment could be too large to be indicated via a relative TPC command. The power control performance using scheme 2 is heavily dependent on the measurement accuracy of the uplink channel and the channel variance (including fading and interference) during the time of TPC generation and the time to apply the TPC command.

For PUCCH, only scheme 1 may be used in LTE. For PUSCH, the power control scheme may be configured via a RRC (radio resource control) signaling. For example, information element (IE) UplinkPowerControlDedicated may be used to indicate which scheme is applied for PUSCH power control:

```
UplinkPowerControlDedicatedSCell-r10 ::=   SEQUENCE {
    p0-UE-PUSCH-r10             INTEGER (-8..7),
    deltaMCS-Enabled-r10        ENUMERATED {en0, en1},
    accumulationEnabled-r10     BOOLEAN,
    pSRS-Offset-r10             INTEGER (0..15),
    pSRS-OffsetAp-r10           INTEGER (0..15)  OPTIONAL,
      -- Need OR
    filterCoefficient-r10       FilterCoefficient           DEFAULT fc4,
    pathlossReferenceLinking-r10    ENUMERATED {pCell, sCell}
}
```

On the other hand, URLLC (ultra-reliable and low latency communication) traffic has been identified as one key traffic to be served in new radio (NR). Compared to other traffics, such as eMBB (enhanced mobile broadband) traffic, there are the following characteristics for URLLC.

For example, data packet for URLLC traffic is much smaller; the arrival of data packet is much sparse; much lower delay budget over air interface; low MAC (media access control) delay is required in the air interface and possibly RLC (radio link control)/PDCP (packet data convergence protocol) ARQ (automatic repeat request) is not applicable.

As a new type of traffic, URLLC requires new transmission behavior in the air interface. Considering much sparser data transmission for URLLC service compared to the eMBB service, it seems that scheme 2 (indicate an absolute value for transmit power adjustment) is more preferred for URLLC service.

SUMMARY

However, it has been found that for sparse data transmission, scheme 2 may encounter a problem of measurement error. For example, the TPC command generated from a transmission far before the current transmission is outdated for current transmission and thus the power control command transmission may subject to error.

Moreover, scheme 2 in a semi-static configuration manner cannot enable power control to obtain power efficiency and interference control benefits from some cases in which there are relatively frequent data transmission for URLLC traffic.

In order to solve at least part of the above problems, methods, apparatus, devices and computer programs are provided in the present disclosure. It can be appreciated that embodiments of the present disclosure are not limited to a wireless system operating in NR network, but could be more widely applied to any application scenario where similar problems exist.

Various embodiments of the present disclosure mainly aim at providing methods, devices and computer programs for controlling a transmission between a transmitter and a receiver, for example, in a shared frequency band. Either of the transmitter and the receiver could be, for example, a terminal device or a network device. Other features and advantages of embodiments of the present disclosure will also be understood from the following description of specific embodiments when reading in conjunction with the accompanying drawings, which illustrate, by way of example, the principles of embodiments of the present disclosure.

In general, embodiments of the present disclosure provide a solution for power controlling. It is determined whether a first transmit power control configuration based on the last uplink transmission is outdated; and a second transmit power control configuration for a current uplink transmission is determined based on a close loop power control scheme and/or an open loop power control scheme.

In a first aspect, there is provided a method in a terminal device for determining power control configuration, comprising: determining whether a first transmit power control configuration based on a first uplink transmission is outdated when a second uplink transmission is scheduled using an uplink grant by a network device; determining a second transmit power control configuration for the second uplink transmission based on a close loop power control scheme and/or an open loop power control scheme.

In one embodiment, the second transmit power control configuration is determined based on the close loop power control scheme when the first transmit power control configuration is not outdated; and/or, the second transmit power control configuration is determined based on the open loop power control scheme when the first transmit power control configuration is outdated.

In one embodiment, the close loop power control scheme comprises that the second transmit power control configuration is determined based on a transmit power control command in the uplink grant from the network device; the open loop power control scheme comprises that the second transmit power control configuration is determined based on a predetermined parameter of the terminal device.

In one embodiment, the method further comprising: initiating a first timer with a preconfigured value when the first uplink transmission is transmitted; and it is determined that the first transmit power control configuration is outdated when the first timer expires before the second uplink transmission is scheduled.

In one embodiment, the method further comprising: receiving a first indication from the network device indicating the close loop power control scheme is to be applied or the open loop power control scheme is to be applied; and it is determined that the first transmit power control configuration is outdated according to the first indication.

In one embodiment, a second timer with a preconfigured value is initiated by the network device when the first uplink transmission is received, and the first indication in the uplink grant is transmitted by the network device if the second timer expires when the second uplink transmission is scheduled.

In one embodiment, the first indication is transmitted via downlink control information; and a transmit power control command is comprised in the downlink control information when the first indication is used to indicate that the close loop power control scheme is to be applied.

In one embodiment, the second transmit power control configuration for the second uplink transmission is further determined based on the close loop power control scheme and the open loop power control scheme.

In one embodiment, the second transmit power control configuration for the second uplink transmission is determined based on the following formula, $$f_c(i)=\max(f_c(i-1)+tpc \cdot \text{step}, \Delta)$$

wherein, $f_c(i)$ denotes the second transmit power control configuration for the second uplink transmission, $f_c(i-1)$ denotes accumulation of transmit power control configuration by the last uplink transmission, tpc denotes a transmit power control command from the network device in the close loop power control scheme, step denotes a configured power control step size, $\Delta$ denotes a predetermined parameter of the terminal device in the open loop power control scheme.

In one embodiment, the second transmit power control configuration for the second uplink transmission is determined based on the following formula, $$f_c(i) = \max(tpc \cdot step, \Delta)$$

wherein, $f_c(i)$ denotes the second transmit power control configuration for the second uplink transmission, tpc denotes a transmit power control command from the network device in the close loop power control scheme, step denotes a configured power control step size, $\Delta$ denotes a predetermined parameter of the terminal device in the open loop power control scheme.

In one embodiment, the second transmit power control configuration for the second uplink transmission is determined based on the following formula, $$f_c(i) = \varepsilon \cdot (f_c(i-1) + tpc \cdot step) + (1-\varepsilon) \cdot \Delta$$

wherein, $f_c(i)$ denotes the second transmit power control configuration for the second uplink transmission, $f_c(i-1)$ denotes accumulation of transmit power control configuration by the last uplink transmission, tpc denotes a transmit power control command from the network device in the close loop power control scheme, step denotes a configured power control step size, $\Delta$ denotes a predetermined parameter of the terminal device in the open loop power control scheme, $\varepsilon$ denotes a factor and $0 \le \varepsilon \le 1$.

In one embodiment, the second transmit power control configuration for the second uplink transmission is determined based on the following formula, $$f_c(i) = \varepsilon \cdot (tpc \cdot step) + (1-\varepsilon) \cdot \Delta$$

wherein, $f_c(i)$ denotes the second transmit power control configuration for the second uplink transmission, tpc denotes a transmit power control command from the network device in the close loop power control scheme, step denotes a configured power control step size, $\Delta$ denotes a predetermined parameter of the terminal device in the open loop power control scheme, $\varepsilon$ denotes a factor and $0 \le \varepsilon \le 1$.

In one embodiment, the method further comprising: receiving a relative transmit power control command or an absolute transmit power command, and a second indication for indicating the relative transmit power control command is transmitted or the absolute transmit power command is transmitted.

In one embodiment, the second indication is transmitted via downlink control information; and the relative transmit power control command or the absolute transmit power command is comprised in the downlink control information.

In one embodiment, the method further comprising: receiving a configuration information for configuring a power control scheme.

In one embodiment, the configuration information is transmitted via a radio resource control (RRC) signaling or a media access control (MAC) control element (CE).

In one embodiment, the power control scheme comprises one of the following: a scheme in which accumulation of transmit power control configuration is applied; a scheme in which accumulation of transmit power control configuration is not applied; a scheme in which the close loop power control scheme and the open loop power control scheme is conditionally switched; a scheme in which a maximum value is applied based on the close loop power control scheme and the open loop power control scheme; a scheme in which a factor is applied based on the close loop power control scheme and the open loop power control scheme; a scheme in which a relative transmit power control command or an absolute transmit power command is conditionally switched.

In a second aspect, there is provided a method in a network device for determining power control configuration, comprising: scheduling a second uplink transmission from a terminal device by using an uplink grant; wherein it is determined that whether a first transmit power control configuration based on a first uplink transmission is outdated in the terminal device when the second uplink transmission is scheduled; and a second transmit power control configuration for the second uplink transmission is determined based on a close loop power control scheme and/or an open loop power control scheme.

In one embodiment, the second transmit power control configuration is determined based on the close loop power control scheme when the first transmit power control configuration is not outdated; and/or, the second transmit power control configuration is determined based on the open loop power control scheme when the first transmit power control configuration is outdated.

In one embodiment, the close loop power control scheme comprises that the second transmit power control configuration is determined based on a transmit power control command in the uplink grant from the network device; the open loop power control scheme comprises that the second transmit power control configuration is determined based on a predetermined parameter of the terminal device.

In one embodiment, the method further comprising: initiating a second timer with a preconfigured value when the first uplink transmission is transmitted; and transmitting a first indication in the uplink grant to the terminal device for indicating the close loop power control scheme is to be applied or the open loop power control scheme is to be applied, if the second timer expires when the second uplink transmission is scheduled.

In one embodiment, the first indication is transmitted via downlink control information; and a transmit power control command is comprised in the downlink control information when the first indication is used to indicate that the close loop power control is applied.

In one embodiment, the method further comprising: transmitting a relative transmit power control command or an absolute transmit power command, and a second indication for indicating the relative transmit power control command is transmitted or the absolute transmit power command is transmitted.

In one embodiment, the second indication is transmitted via downlink control information; and the relative transmit power control command or the absolute transmit power command is comprised in the downlink control information.

In one embodiment, the method further comprising: transmitting a configuration information for configuring a power control scheme.

In one embodiment, the configuration information is transmitted via a radio resource control (RRC) signaling or a media access control (MAC) control element (CE).

In a third aspect, there is provide a terminal device, comprising a processor and a memory, wherein the memory containing instructions executable by the processor whereby the terminal device is operative to perform a method for determining power control configuration according to the first aspect.

In a fourth aspect, there is provide a network device, comprising a processor and a memory, wherein the memory containing instructions executable by the processor whereby the network device is operative to perform a method for determining power control configuration according to the second aspect.

In a fifth aspect, there is provide a communications system, comprising: a terminal device configured to perform a method for determining power control configuration according to the first aspect; and a network device configured to perform a method for determining power control configuration according to the second aspect.

According to various embodiments of the present disclosure, it is determined whether a first transmit power control configuration based on the last uplink transmission is outdated; and a second transmit power control configuration for a current uplink transmission is determined based on a close loop power control scheme and/or an open loop power control scheme. Therefore, transmit power control efficiency of sparse data transmissions may be improved.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
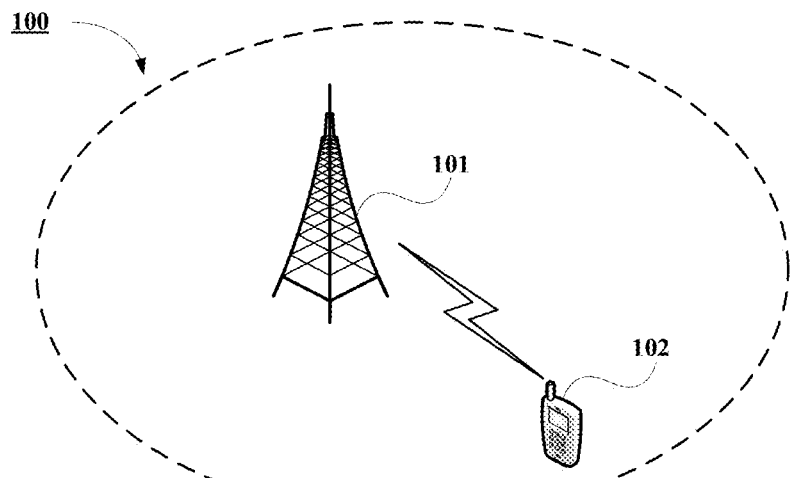
FIG. 1 is a schematic diagram which shows a wireless communication network.

The present disclosure will now be discussed with reference to several example embodiments. It should be understood that these embodiments are discussed only for the purpose of enabling those skilled persons in the art to better understand and thus implement the present disclosure, rather than suggesting any limitations on the scope of the present disclosure.

As used herein, the term "wireless communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable, and/or other suitable the first generation (1G), the second generation (2G), 2.5G, 2.75G, the third generation (3G), the fourth generation (4G), 4.5G, the future fifth generation (5G) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network device" refers to a device in a wireless communication network via which a terminal device accesses the network and receives services therefrom. The network device refers a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, voice over IP (VoIP) phones, wireless local loop phones, a tablet, a wearable device, a personal digital assistant (PDA), portable computers, desktop computer, image capture terminal devices such as digital cameras, gaming terminal devices, music storage and playback appliances, wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink, DL transmission refers to a transmission from the network device to a terminal device, and an uplink, UL transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

Now some exemplary embodiments of the present disclosure will be described below with reference to the figures.

FIG. 1 shows a schematic diagram of a wireless communication network 100 in which embodiments of the disclosure may be implemented. As shown in FIG. 1, the wireless communication network 100 may include one or more network devices, for example network devices 101. It will be appreciated that the network device 101 could also be in a form of gNB, Node B, eNB, BTS (Base Transceiver Station), and/or BSS (Base Station Subsystem), access point (AP) and the like. The network device 101 may provide radio connectivity to a set of terminal devices or UEs 102-1, 102-2, ..., 102-N (collectively referred to as "terminal device(s) 102) within its coverage, where N is a natural number. In the example of FIG. 1, the network device 101 may provide services to the terminal device 102. The traffic between the network device 101 and the terminal device 102 may be URLLC (ultra-reliable and low latency communication) traffic, eMBB (enhanced mobile broadband) traffic, mMTC (massive machine type communication) traffic, and so on. Although network device 101 illustrated in the example wireless communication network may represent a device that includes a particular combination of hardware components, other embodiments may comprise network nodes with different combinations of components. It is to be understood that a network device may comprise any suitable combination of hardware and/or software needed to perform the tasks, features, functions and methods disclosed herein.

It is to be understood that the configuration of FIG. 1 is described merely for the purpose of illustration, without suggesting any limitation as to the scope of the present disclosure. Those skilled in the art would appreciate that the wireless communication network 100 may include any suitable number of terminal devices and/or network devices and may have other suitable configurations.

In this disclosure, URLLC traffic will be illustrated as an example, but it is not limited thereto. The solution or method or apparatus of the present disclosure may also be applicable for other scenarios.

As illustrated above, scheme 1 and scheme 2 in the existing solution for transmit power controlling may not be suitable for some scenarios (such as URLLC traffic). Transmit power control efficiency in some scenarios (such as some cases for sparse data transmission) needs to be improved.

First Aspect of Embodiments

A method for determining power control configuration is provided in an embodiment. The method is implemented at a terminal device as an example.

Figure 2:
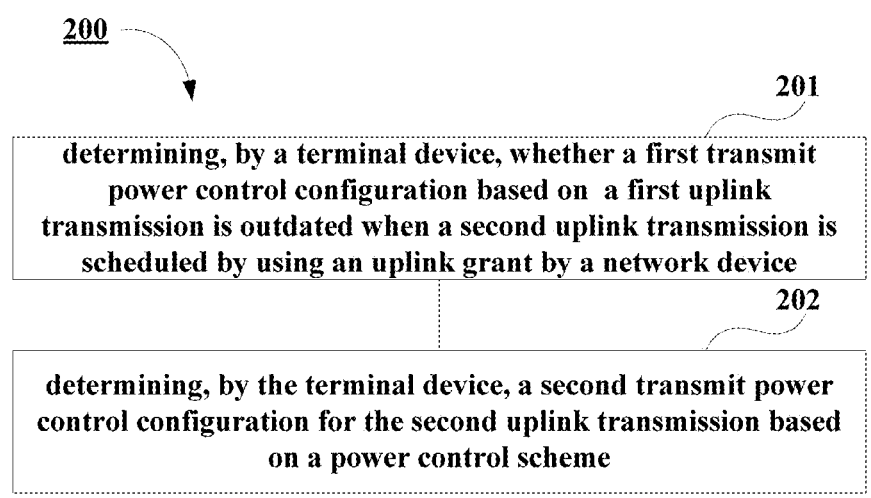
FIG. 2 is a diagram which shows a method for determining power control configuration in accordance with an embodiment of the present disclosure.

FIG. 2 is a diagram which shows a method 200 for determining power control configuration in accordance with an embodiment of the present disclosure, and illustrates the method for determining power control configuration by taking a terminal device as an example.

As shown in FIG. 2, the method 200 includes determining, by a terminal device, whether a first transmit power control configuration based on the last (or previous) uplink transmission (which may be regarded as a first uplink transmission) is outdated when a current uplink transmission (which may be regarded as a second uplink transmission) is scheduled by using an uplink grant by a network device, at block 201.

The first uplink transmission may be the previous (or last) uplink transmission for the second uplink transmission. For example, the first control configuration may be generated from (or derived from, or in response to, or corresponding to, . . . , and so on) the first uplink transmission. For another example, the first control configuration may be used for the first uplink transmission in some scenarios, but it is not limited thereto.

As shown in FIG. 2, the method 200 further includes determining, by the terminal device, a second transmit power control configuration for the second uplink transmission based on (or according to) a power control scheme; such as a close loop power control scheme and/or an open loop power control scheme, at block 202.

In an embodiment, the close loop power control scheme may include that the second transmit power control configuration is determined (or may be selected or acquired, and so on) based on a transmit power control command in the uplink grant from the network device; the open loop power control scheme may include that the second transmit power control configuration is determined based on a predetermined parameter of the terminal device.

It should be appreciated that it is not limited thereto, generally, the close loop power control scheme may indicate that the second transmit power control configuration is determined based on any parameter (or configuration, or information, and so on) from the network device; the open loop power control scheme may indicate that the second transmit power control configuration is determined based on any predetermined parameter (or configuration, or information, and so on), or any parameter (or configuration, or information, and so on) from the terminal device.

In an embodiment, whether a first transmit power control configuration is outdated may be determined by comparing an age (i.e. duration time after the power control configuration) of the first transmit power control configuration (such as $f_c(i-1)$) and a preconfigured threshold. For example, a timer may be set in the terminal device and/or in the network device.

In an embodiment, dynamic switch between the close loop power control scheme and the open loop power control scheme may be performed. For the sake of simplicity, this solution may be referred to as scheme 3 (or DynamicSwitch1).

Figure 3:
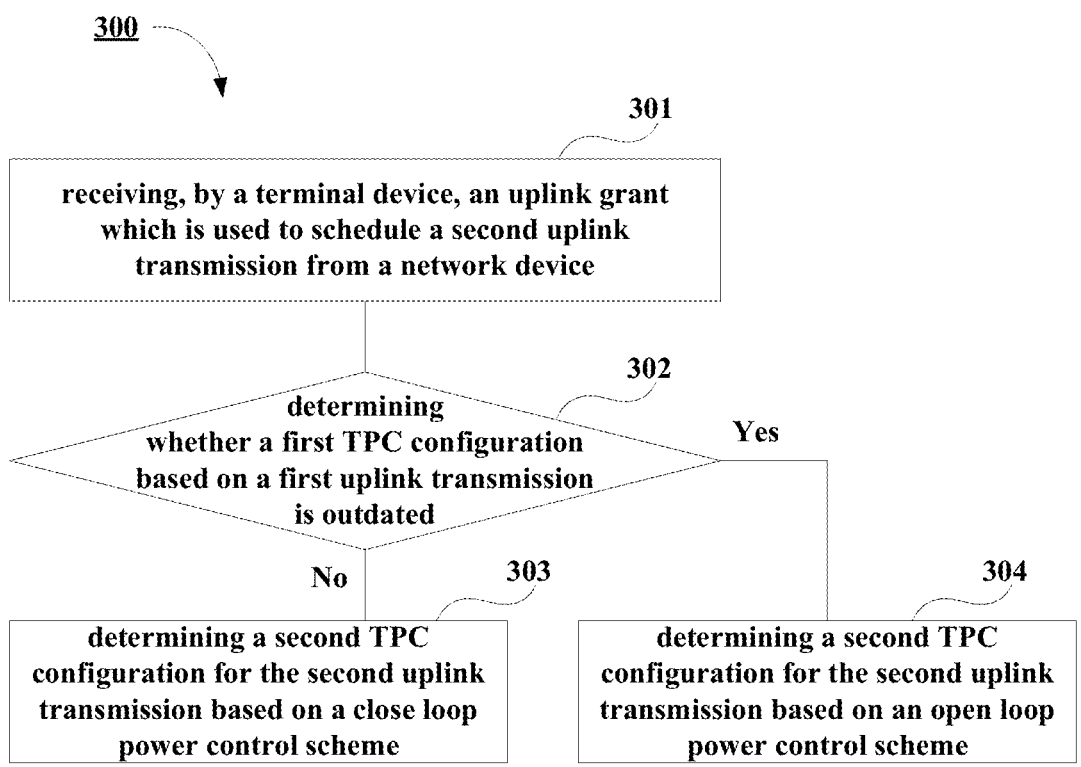
FIG. 3 is another diagram which shows a method for determining power control configuration in accordance with an embodiment of the present disclosure.

FIG. 3 is another diagram which shows a method 300 for determining power control configuration in accordance with an embodiment of the present disclosure, and illustrates the method for determining power control configuration by taking a terminal device as an example.

As shown in FIG. 3 the method 300 includes receiving, by a terminal device, an uplink grant which is used to schedule an uplink transmission (which regarded as a second uplink transmission, or a current uplink transmission) from a network device, at block 301.

As shown in FIG. 3, the method 300 includes determining, by the terminal device, whether a first transmit power control configuration based on the previous (or last) uplink transmission (which may be regarded as a first uplink transmission) is outdated, at block 302.

As shown in FIG. 3, the method 300 further includes determining, by the terminal device, a second transmit power control configuration for the second uplink transmission based on (or according to) a close loop power control scheme when the first transmit power control configuration is not outdated, at block 303.

As shown in FIG. 3, the method 300 further includes determining, by the terminal device, the second transmit power control configuration for the second uplink transmission based on (or according to) an open loop power control scheme when the first transmit power control configuration is outdated, at block 304.

It should be appreciated that FIGS. 2-3 are only examples of the disclosure, but it is not limited thereto. For example, the order of operations at blocks may be adjusted and/or some blocks may be omitted. Moreover, some blocks not shown in FIGS. 2-3 may be added.

Next two examples are used to illustrate how to determine the first transmit power control configuration based on the last uplink transmission is outdated. However, this disclosure is not limited thereto.

In an embodiment, the terminal device initiates a first timer with a preconfigured value when the first uplink transmission is transmitted (for example, the first timer may be initiated according to the start time of the first uplink transmission, but it is not limited thereto); and it is determined that the first transmit power control configuration is outdated when the first timer expires before the second uplink transmission is scheduled.

For example, when a data transmission is transmitted in uplink, a UE initiates a first timer with configured value. If there is a scheduled uplink data transmission before the timer expires, the first timer is restarted and the close loop power control scheme is to be applied, i.e. transmit power is adjusted based on the TPC command carried in the uplink grant.

When the first timer expires before the next uplink data transmission, it can be regarded that the TPC command generated (or derived) based on the last uplink transmission is outdated and the transmit power is determined according to the open loop power control. For instance, $f_c(i)$ may be reset to a preconfigured power offset (may be referred to as $\Delta$).

In another embodiment, the network device may initiate a second timer with a preconfigured value when the first uplink transmission is received, and may transmit a first indication in the uplink grant, if the second timer expires when the second uplink transmission is scheduled.

The terminal device may receive the first indication from the network device for indicating the close loop power control scheme is to be applied or the open loop power control scheme is to be applied; and it is determined that the first transmit power control configuration is outdated according to the first indication.

For example, the second timer can be implemented at a base station (such as a gNB) side and the gNB determines whether open loop power control or close loop power control is to be applied for the uplink transmission to be scheduled.

In this embodiment, the first indication may be transmitted via downlink control information (DCI); and a transmit power control command may be comprised in the downlink control information when the first indication is used to indicate that the close loop power control scheme is to be applied.

For example, the gNB may indicate the UE to use open loop power control or close loop power control using a new field in DCI. If it is determined that close loop power control is to be used, the gNB may also include the TPC command generated based on the last transmission into the DCI and transmit it to the UE.

In an embodiment, the close loop power control scheme and the open loop power control scheme may be combined to determine the second transmit power control configuration for the second uplink transmission.

For example, since the TPC accumulation with relative power adjustment value (see the scheme 1) may improve efficiency of UE transmission power usage, reduce interference from UE and improve data transmission reliability, it may be expected that the power control performance may be improved by using $f_c(i-1)$ in certain way even when $f_c(i-1)$ is not fully reliable.

In an embodiment, a maximum value may be applied based on the close loop power control scheme and the open loop power control scheme. For the sake of simplicity, this solution may be referred to as scheme 4 (or CombineOption1).

For example, the second transmit power control configuration for the second uplink transmission may be determined based on the following formula, for example, when the first transmit power control configuration is not outdated, but it is not limited thereto, for example, this following formula may also be adopted when the first transmit power control configuration is outdated.

$$f_c(i) = \max(f_c(i-1) + tpc \cdot \text{step}, \Delta)$$

where, $f_c(i)$ denotes the second transmit power control configuration for the second uplink transmission, $f_c(i-1)$ denotes accumulation of transmit power control configuration by the last uplink transmission, tpc denotes a transmit power control command from the network device in the close loop power control scheme, step denotes a configured power control step size, $\Delta$ denotes a predetermined parameter of the terminal device in the open loop power control scheme.

For another example, the second transmit power control configuration for the second uplink transmission is determined based on the following formula, for example, when the first transmit power control configuration is outdated, but it is not limited thereto, for example, this formula may also be adopted when the first transmit power control configuration is not outdated.

$$f_c(i) = \max(tpc \cdot \text{step}, \Delta)$$

where, $f_c(i)$ denotes the second transmit power control configuration for the second uplink transmission, tpc denotes a transmit power control command from the network device in the close loop power control scheme, step denotes a configured power control step size, $\Delta$ denotes a predetermined parameter of the terminal device in the open loop power control scheme.

Compared to scheme 1 and 2, scheme 4 may boost the power more substantially.

In an embodiment, a factor may be applied based on the close loop power control scheme and the open loop power control scheme. For the sake of simplicity, this solution may be referred to as scheme 5 (or CombineOption2).

For example, the second transmit power control configuration for the second uplink transmission is determined based on the following formula, for example, when the first transmit power control configuration is not outdated, but it is not limited thereto, for example, this formula may also be adopted when the first transmit power control configuration is outdated.

$$f_c(i) = \varepsilon \cdot (f_c(i-1) + tpc \cdot \text{step}) + (1-\varepsilon) \cdot \Delta$$

where, $f_c(i)$ denotes the second transmit power control configuration for the second uplink transmission, $f_c(i-1)$ denotes accumulation of transmit power control configuration by the last uplink transmission, tpc denotes a transmit power control command from the network device in the close loop power control scheme, step denotes a configured power control step size, $\Delta$ denotes a predetermined parameter of the terminal device in the open loop power control scheme, $\varepsilon$ denotes a factor and $0 \leq \varepsilon \leq 1$.

For another example, the second transmit power control configuration for the second uplink transmission is determined based on the following formula, for example, when the first transmit power control configuration is outdated, but it is not limited thereto, for example, this formula may also be adopted when the first transmit power control configuration is not outdated.

$$f_c(i) = \varepsilon \cdot (tpc \cdot \text{step}) + (1-\varepsilon) \cdot \Delta$$

where, $f_c(i)$ denotes the second transmit power control configuration for the second uplink transmission, tpc denotes a transmit power control command from the network device in the close loop power control scheme, step denotes a configured power control step size, $\Delta$ denotes a predetermined parameter of the terminal device in the open loop power control scheme, $\varepsilon$ denotes a factor and $0 \leq \varepsilon \leq 1$.

In this embodiment, a certain ratio (or factor, may be referred to as &) is taken into the evaluation of $f_c(i)$ according to age of $f_c(i-1)$ or the last uplink transmission. A mapping table between the ratio (or factor) values and the age values may be preconfigured or predefined so that the UE c may determine the ratio by looking up the table.

For example, table 1 shows an example of the values.

TABLE 1

Mapping between the age of the last uplink transmission and the $\varepsilon$ value

| Age of last transmission | $\varepsilon$ |
| --- | --- |
| Small age | 1 |
| Medium age 1 | v1 (v1 > v2) |
| Medium age 2 (>Medium age 1) | v2 (v2 > 0) |
| Large age | 0 |

It should be appreciated that the values are only examples of the disclosure, but it is not limited thereto. Furthermore, the maximum value and the factor are only examples of the disclosure, but it is not limited thereto. For example, an average value or variance value may be adopted according to the actual scenario.

In an embodiment, dynamic switch may be performed between a relative TPC value and an absolute TPC value. For the sake of simplicity, this solution may be referred to as scheme 6 (or DynamicSwitch2).

In this embodiment, the terminal device may receive a relative transmit power control command or an absolute transmit power command from the network device, and also may receive a second indication for indicating the relative transmit power control command is transmitted or the absolute transmit power command is transmitted.

The second indication may be transmitted via downlink control information; and the relative transmit power control command or the absolute transmit power command may be comprised in the downlink control information.

For example, a gNB may generate both a relative TPC command (i.e. a simple indication to increase/decrease the transmit power by a preconfigured step) and an absolute TPC command (i.e. indication of an absolute value for transmit power increase/decrease) based on an uplink channel measurement. The gNB then may determine to transmit the relative TPC command when the age of the last uplink transmission is smaller than a predefined threshold, otherwise the eNB may determine to transmit the absolute TPC command to the UE.

In an embodiment, when there are multiple power control schemes, an index for the power control schemes may be predefined and configuration information may be transmitted when a power control scheme shall be applied.

In this embodiment, the terminal device may receive a configuration information for configuring a power control scheme from the network device. The configuration information may be transmitted via a radio resource control (RRC) signaling or a media access control (MAC) control element (CE). But it is not limited thereto, other signaling may be adopted according to the actual scenario.

For example, the power control scheme may include one of the following: a scheme in which accumulation of transmit power control configuration is applied (i.e. the scheme 1); a scheme in which accumulation of transmit power control configuration is not applied (i.e. the scheme 2); a scheme in which the close loop power control scheme and the open loop power control scheme is conditionally switched (i.e. the scheme 3); a scheme in which a maximum value is applied based on the close loop power control scheme and the open loop power control scheme (i.e. the scheme 4); a scheme in which a factor is applied based on the close loop power control scheme and the open loop power control scheme (i.e. the scheme 5); and a scheme in which a relative transmit power control command or an absolute transmit power command is conditionally switched (i.e. the scheme 6).

It should be appreciated that the schemes are only examples of the disclosure, but it is not limited thereto. For example, other schemes may be adopted according to the actual scenario.

Figure 4:
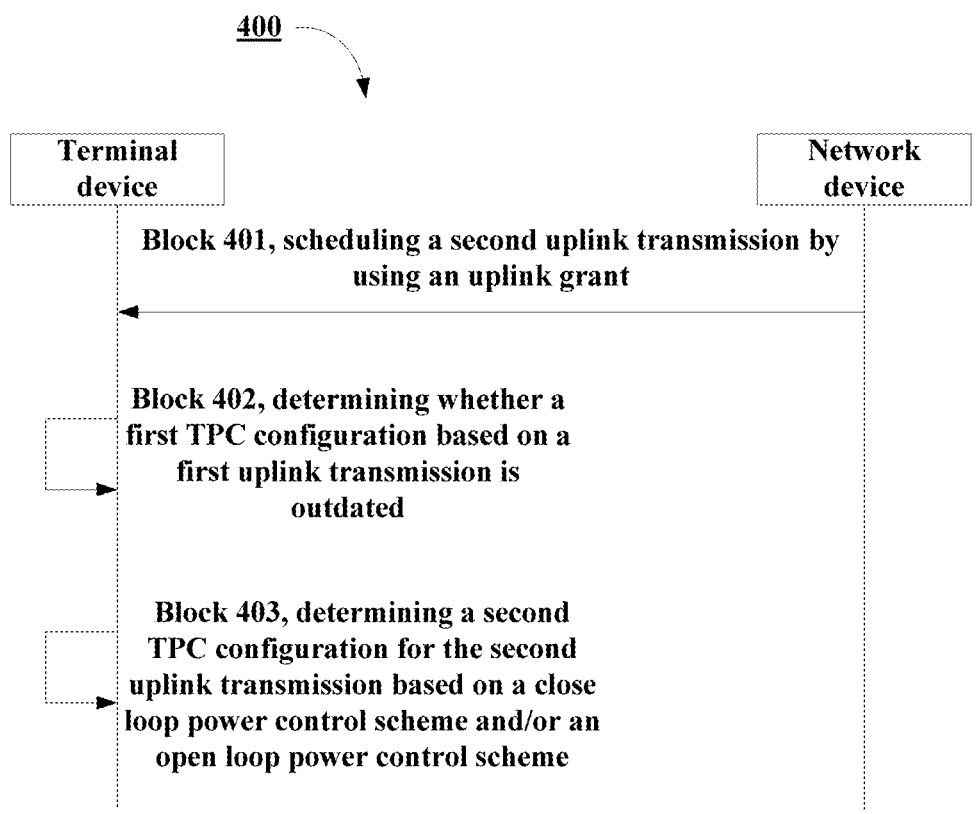
FIG. 4 is another diagram which shows a method for determining power control configuration in accordance with an embodiment of the present disclosure.

For example, an example of RRC IE (information element) for configuring power control scheme is shown, the example may come from an existing RRC IE by FIG. 4 is another diagram which shows a method 400 for determining power control configuration in accordance with an embodiment of the present disclosure, and illustrates the method for determining power control configuration by taking a terminal device and a network device as an example.

As shown in FIG. 4, the method 400 includes scheduling, by a network device, an uplink transmission (which regarded as a second uplink transmission) from a terminal device by using an uplink grant, at block 401.

As shown in FIG. 4, the method 400 includes determining, by the terminal device, whether a first transmit power control configuration based on the last uplink transmission (which may be regarded as a first uplink transmission) is outdated, at block 402;

As shown in FIG. 4, the method 400 further includes determining, by the terminal device, a second transmit power control configuration for the second uplink transmission based on (or according to) a power control scheme; such as a close loop power control scheme and/or an open loop power control scheme, at block 403.

In an embodiment, the second transmit power control configuration may be determined based on the close loop power control scheme when the first transmit power control configuration is not outdated; and/or, the second transmit power control configuration may be determined based on the open loop power control scheme when the first transmit power control configuration is outdated.

In an embodiment, the close loop power control scheme may comprise that the second transmit power control configuration is determined based on a transmit power control command in the uplink grant from the network device; the open loop power control scheme may comprise that the

```
UplinkPowerControlDedicatedSCell-r10 ::=         SEQUENCE {
    p0-UE-PUSCH-r10                              INTEGER (-8..7),
    deltaMCS-Enabled-r10                         ENUMERATED {en0, en1},
    power-control-scheme-index ENUMERATED (Scheme1, Scheme2,
    DynmicSwitch1, CominueOption1, CombineOption2, DynamicSwitch2)
    accumulationEnabled-r10                      BOOLEAN,
    pSRS-Offset-r10                              INTEGER (0..15),
    pSRS-OffsetAp-r10            INTEGER (0..15)              OPTIONAL,
        -- Need OR
    filterCoefficient-r10        FilterCoefficient            DEFAULT fc4,
    pathlossReferenceLinking-r10     ENUMERATED {pCell, sCell}
}
modifying the accumulationEnabled-r10.
```

It should be appreciated that the RRC IE is only an example of the disclosure, but it is not limited thereto. For example, other configuration information may be adopted according to the actual scenario.

As can be seen from the above embodiments, it is determined whether a first transmit power control configuration based on the last uplink transmission is outdated; and a second transmit power control configuration for a current uplink transmission is determined based on a close loop power control scheme and/or an open loop power control scheme. Therefore, transmit power control efficiency of sparse data transmissions may be improved.

Second Aspect of Embodiments

A method for determining power control configuration is provided in an embodiment. The method is implemented at a network device as an example, and the same contents as those in the first aspect of embodiments are omitted.

second transmit power control configuration is determined based on a predetermined parameter of the terminal device.

In an embodiment, the method may further include: initiating, by the network device, a second timer with a preconfigured value when the first uplink transmission is received; and transmitting, by the network device, a first indication in the uplink grant to the terminal device for indicating the close loop power control scheme is to be applied or the open loop power control scheme is to be applied, if the second timer expires when the second uplink transmission is scheduled.

For example, the first indication may be transmitted via downlink control information; and a transmit power control command may be comprised in the downlink control information when the first indication is used to indicate that the close loop power control is applied.

In an embodiment, the method may further include: transmitting, by the network device to the terminal device, a relative transmit power control command or an absolute transmit power command, and a second indication for indicating the relative transmit power control command is transmitted or the absolute transmit power command is transmitted.

For example, the second indication may be transmitted via downlink control information; and the relative transmit power control command or the absolute transmit power command may be comprised in the downlink control information.

In an embodiment, the method may further include: transmitting, by the network device, a configuration information for configuring a power control scheme.

For example, the configuration information may be transmitted via a radio resource control (RRC) signaling or a media access control (MAC) control element (CE).

As can be seen from the above embodiments, it is determined whether a first transmit power control configuration based on the last uplink transmission is outdated; and a second transmit power control configuration for a current uplink transmission is determined based on a close loop power control scheme and/or an open loop power control scheme. Therefore, transmit power control efficiency of sparse data transmissions may be improved.

Third Aspect of Embodiments

An apparatus for determining power control configuration is provided in an embodiment. The apparatus may be configured in the terminal device 102, and the same contents as those in the first aspect of embodiments are omitted.

Figure 5:
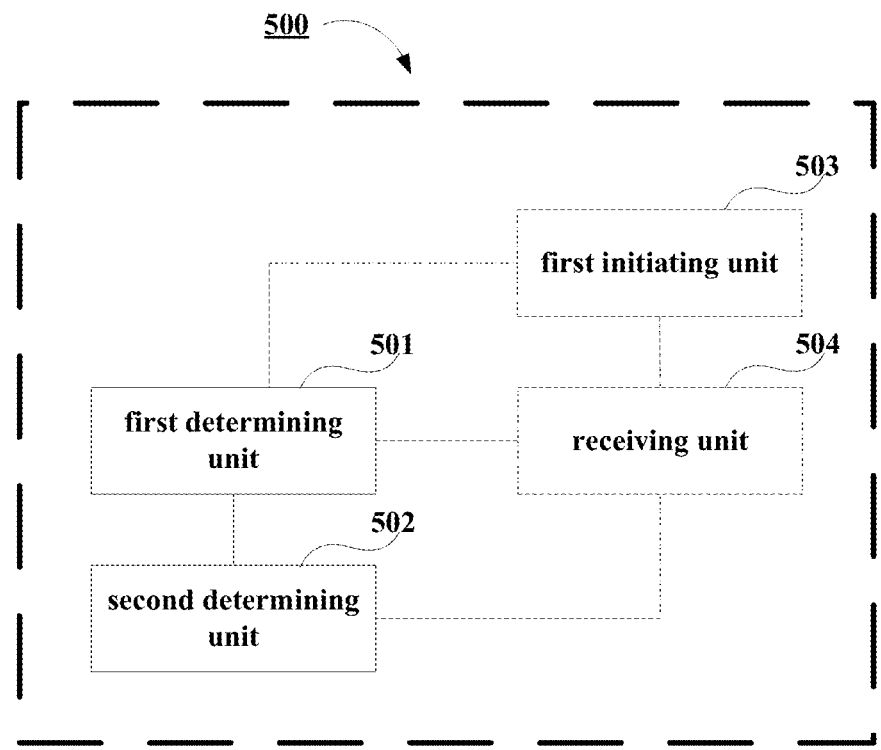
FIG. 5 is a block diagram which shows an apparatus for determining power control configuration in accordance with an embodiment of the present disclosure.

FIG. 5 shows a block diagram of an apparatus 500 for determining power control configuration in accordance with an embodiment of the present disclosure.

As shown in FIG. 5, the apparatus 500 includes: a first determining unit 501 configured to determine whether a first transmit power control configuration based on a first uplink transmission is outdated when a second uplink transmission is scheduled by using an uplink grant by a network device; and a second determining unit 502 configured to determine a second transmit power control configuration for the second uplink transmission based on a power control scheme; such as a close loop power control scheme and/or an open loop power control scheme.

In an embodiment, the second transmit power control configuration may be determined based on the close loop power control scheme when the first transmit power control configuration is not outdated; and/or the second transmit power control configuration may be determined based on the open loop power control scheme when the first transmit power control configuration is outdated.

In an embodiment, the close loop power control scheme may comprise that the second transmit power control configuration is determined based on a transmit power control command in the uplink grant from the network device; the open loop power control scheme may comprise that the second transmit power control configuration is determined based on a predetermined parameter of the terminal device.

In an embodiment, as shown in FIG. 5, the apparatus 500 may further include: a first initiating unit 503 configured to initiate a first timer with a preconfigured value when the first uplink transmission is transmitted; and it is determined that the first transmit power control configuration is outdated when the first timer expires before the second uplink transmission is scheduled.

In an embodiment, as shown in FIG. 5, the apparatus 500 may further include: a receiving unit 504 configured to receive a first indication from the network device for indicating the close loop power control scheme is to be applied or the open loop power control scheme is to be applied; and it is determined that the first transmit power control configuration is outdated according to the first indication.

In this embodiment, the network device may initiate a second timer with a preconfigured value when the first uplink transmission is received, and may transmit the first indication in the uplink grant if the second timer expires when the second uplink transmission is scheduled.

In this embodiment, the first indication may be transmitted via downlink control information; and a transmit power control command may be comprised in the downlink control information when the first indication is used to indicate that the close loop power control scheme is applied.

In an embodiment, the second transmit power control configuration for the second uplink transmission may further be determined based on the close loop power control scheme and the open loop power control scheme.

For example, the second transmit power control configuration for the second uplink transmission is determined based on the following formula, for example, when the first transmit power control configuration is not outdated, $$f_c(i) = \max(f_c(i-1) + tpc \cdot \text{step}, \Delta)$$

where, $f_c(i)$ denotes the second transmit power control configuration for the second uplink transmission, $f_c(i-1)$ denotes accumulation of transmit power control configuration by the last uplink transmission, tpc denotes a transmit power control command from the network device in the close loop power control scheme, step denotes a configured power control step size, $\Delta$ denotes a predetermined parameter of the terminal device in the open loop power control scheme.

For another example, the second transmit power control configuration for the second uplink transmission is determined based on the following formula, for example, when the first transmit power control configuration is outdated, $$f_c(i) = \max(tpc \cdot \text{step}, \Delta)$$

where, $f_c(i)$ denotes the second transmit power control configuration for the second uplink transmission, tpc denotes a transmit power control command from the network device in the close loop power control scheme, step denotes a configured power control step size, $\Delta$ denotes a predetermined parameter of the terminal device in the open loop power control scheme.

For another example, the second transmit power control configuration for the second uplink transmission is determined based on the following formula, for example, when the first transmit power control configuration is not outdated, $$f_c(i) = \varepsilon \cdot (f_c(i-1) + tpc \cdot \text{step}) + (1-\varepsilon) \cdot \Delta$$

where, $f_c(i)$ denotes the second transmit power control configuration for the second uplink transmission, $f_c(i-1)$ denotes accumulation of transmit power control configuration by the last uplink transmission, tpc denotes a transmit power control command from the network device in the close loop power control scheme, step denotes a configured power control step size, $\Delta$ denotes a predetermined parameter of the terminal device in the open loop power control scheme, $\varepsilon$ denotes a factor and $0 \leq \varepsilon \leq 1$.

For another example, the second transmit power control configuration for the second uplink transmission is determined based on the following formula, for example, when the first transmit power control configuration is outdated, $$f_c(i) = \varepsilon \cdot (tpc \cdot \text{step}) + (1-\varepsilon) \cdot \Delta$$

where, $f_c(i)$ denotes the second transmit power control configuration for the second uplink transmission, tpc denotes a transmit power control command from the network device in the close loop power control scheme, step denotes a configured power control step size, $\Delta$ denotes a predetermined parameter of the terminal device in the open loop power control scheme, $\varepsilon$ denotes a factor and $0 \leq \varepsilon \leq 1$.

In an embodiment, the receiving unit 504 may further configured to receive a relative transmit power control command or an absolute transmit power command, and a second indication for indicating the relative transmit power control command is transmitted or the absolute transmit power command is transmitted.

For example, the second indication may be transmitted via downlink control information; and the relative transmit power control command or the absolute transmit power command is comprised in the downlink control information.

In an embodiment, the receiving unit 504 may further configured to receive a configuration information for configuring a power control scheme.

For example, the configuration information may be transmitted via a radio resource control (RRC) signaling or a media access control (MAC) control element (CE).

It should be appreciated that components included in the apparatus 500 correspond to the operations of the method 200 or 300. Therefore, all operations and features described above with reference to FIG. 2 or 3 are likewise applicable to the components included in the apparatus 500 and have similar effects. For the purpose of simplification, the details will be omitted.

It should be appreciated that the components included in the apparatus 500 may be implemented in various manners, including software, hardware, firmware, or any combination thereof.

In an embodiment, one or more units may be implemented using software and/or firmware, for example, machine-executable instructions stored on the storage medium. In addition to or instead of machine-executable instructions, parts or all of the components included in the apparatus 500 may be implemented, at least in part, by one or more hardware logic components.

For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

The apparatus 500 may be a part of a device. But it is not limited thereto, for example, the apparatus 500 may be the terminal device 102, other parts of the terminal device 102, such as transmitter and receiver, are omitted in the FIG. 5.

As can be seen from the above embodiments, it is determined whether a first transmit power control configuration based on the last uplink transmission is outdated; and a second transmit power control configuration for a current uplink transmission is determined based on a close loop power control scheme and/or an open loop power control scheme. Therefore, transmit power control efficiency of sparse data transmissions may be improved.

Fourth Aspect of Embodiments

An apparatus for determining power control configuration is provided in an embodiment. The apparatus may be configured in the network device 101, and the same contents as those in the first or second aspect of embodiments are omitted.

Figure 6:
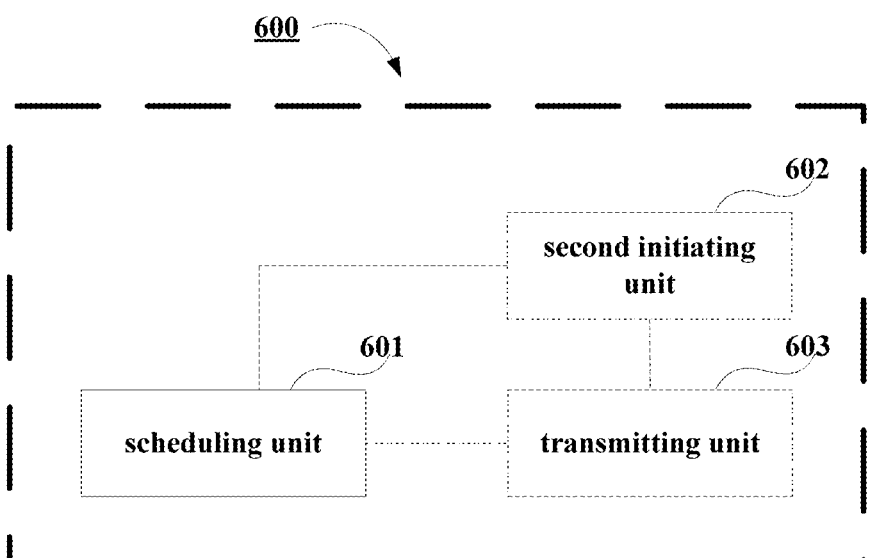
FIG. 6 is another block diagram which shows an apparatus for determining power control configuration in accordance with an embodiment of the present disclosure.

FIG. 6 shows a block diagram of an apparatus 600 for determining power control configuration in accordance with an embodiment of the present disclosure.

As shown in FIG. 6, the apparatus 600 includes: a scheduling unit 601 configured to schedule a second uplink transmission from a terminal device by using an uplink grant; and it is determined that whether a first transmit power control configuration based on a first uplink transmission is outdated in the terminal device when the second uplink transmission is scheduled; and a second transmit power control configuration for the second uplink transmission is determined based on a power control scheme; such as a close loop power control scheme and/or an open loop power control scheme.

In an embodiment, the second transmit power control configuration may be determined based on the close loop power control scheme when the first transmit power control configuration is not outdated; and/or, the second transmit power control configuration may be determined based on the open loop power control scheme when the first transmit power control configuration is outdated.

In an embodiment, the close loop power control scheme may comprise that the second transmit power control configuration is determined based on a transmit power control command in the uplink grant from the network device; the open loop power control scheme may comprise that the second transmit power control configuration is determined based on a predetermined parameter of the terminal device.

In an embodiment, as shown in FIG. 6, the apparatus 600 may further include: a second initiating unit 602 configured to initiate a second timer with a preconfigured value when the first uplink transmission is received; and a transmitting unit 603 configured to transmit a first indication in the uplink grant to the terminal device for indicating the close loop power control scheme is to be applied or the open loop power control scheme is to be applied, if the second timer expires when the second uplink transmission is scheduled.

For example, the first indication may be transmitted via downlink control information; and a transmit power control command may be comprised in the downlink control information when the first indication is used to indicate that the close loop power control is applied.

In an embodiment, the transmitting unit 603 may further be configured to transmit a relative transmit power control command or an absolute transmit power command, and a second indication for indicating the relative transmit power control command is transmitted or the absolute transmit power command is transmitted.

For example, the second indication may be transmitted via downlink control information; and the relative transmit power control command or the absolute transmit power command is comprised in the downlink control information.

In an embodiment, the transmitting unit 603 may further be configured to transmit a configuration information for configuring a power control scheme.

For example, the configuration information may be transmitted via a radio resource control (RRC) signaling or a media access control (MAC) control element (CE).

It should be appreciated that components included in the apparatus 600 correspond to the operations of the method 400. Therefore, all operations and features described above with reference to FIG. 4 are likewise applicable to the components included in the apparatus 600 and have similar effects. For the purpose of simplification, the details will be omitted.

It should be appreciated that the components included in the apparatus 600 may be implemented in various manners, including software, hardware, firmware, or any combination thereof.

In an embodiment, one or more units may be implemented using software and/or firmware, for example, machine-executable instructions stored on the storage medium. In addition to or instead of machine-executable instructions, parts or all of the components included in the apparatus 600 may be implemented, at least in part, by one or more hardware logic components.

For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

The apparatus 600 may be a part of a device. But it is not limited thereto, for example, the apparatus 600 may be the network device 101, other parts of the network device 101, such as transmitter and receiver, are omitted in the FIG. 6.

As can be seen from the above embodiments, it is determined whether a first transmit power control configuration based on the last uplink transmission is outdated; and a second transmit power control configuration for a current uplink transmission is determined based on a close loop power control scheme and/or an open loop power control scheme. Therefore, transmit power control efficiency of sparse data transmissions may be improved.

Fifth Aspect of Embodiments

A communications system is provided, as shown in FIG. 1, the communication system 100 includes a terminal device 102 configured to perform a method for determining power control configuration according to the first aspect of embodiments and a network device 101 configured to perform a method for determining power control configuration according to the second aspect of embodiments.

A device (such as a terminal device 102 or a network device 101) is provided in an embodiment, and the same contents as those in the first aspect and the second aspect of embodiments are omitted.

Figure 7:
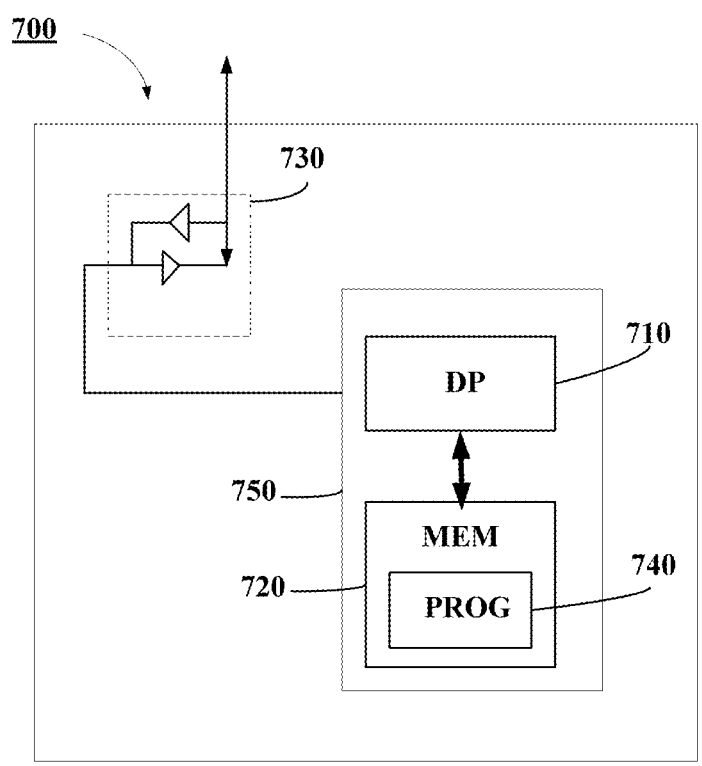
FIG. 7 is a simplified block diagram of a device that is suitable for implementing embodiments of the present disclosure.

FIG. 7 shows a simplified block diagram of a device 700 that is suitable for implementing embodiments of the present disclosure. It would be appreciated that the device 700 may be implemented as at least a part of, for example, the network device 101 or the terminal device 102.

Network device 101 comprises processing circuitry, device readable medium, interface, user interface equipment, auxiliary equipment, power source, power delivery circuitry, and antenna. These components are depicted as single boxes located within a single larger box, and in some cases contain additional boxes therein. In practice however, a network device may comprise multiple different physical components that make up a single illustrated component (e.g., interface comprises ports/terminals for coupling wires for a wired connection and radio front end circuitry for a wireless connection). As another example, network device may be a virtual network node. Similarly, network node may be composed of multiple physically separate components (e.g., a NodeB component and a RNC component, a BTS component and a BSC component, etc.), which may each have their own respective components. In certain scenarios in which network device comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node may be configured to support multiple radio access technologies (RATs). In such embodiments, some components may be duplicated (e.g., separate device readable medium for the different RATs) and some components may be reused (e.g., the same antenna may be shared by the RATs).

As shown, the device 700 includes a communicating means 730 and a processing means 750. The processing means 750 includes a data processor (DP) 710, a memory (MEM) 720 coupled to the DP 710. The communicating means 730 is coupled to the DP 710 in the processing means 750. The MEM 720 stores a program (PROG) 740. The communicating means 730 is for communications with other devices, which may be implemented as a transceiver for transmitting/receiving signals.

In some embodiments where the device 700 acts as a network device. For example, the memory 720 stores a plurality of instructions; and the processor 710 coupled to the memory 720 and configured to execute the instructions to: schedule a second uplink transmission by using an uplink grant.

In some other embodiments where the device 700 acts as a terminal device. For example, the memory 720 stores a plurality of instructions; and the processor 710 coupled to the memory 720 and configured to execute the instructions to: determine whether a first transmit power control configuration based on a first uplink transmission is outdated when a second uplink transmission is scheduled by using an uplink grant by a network device; and determine a second transmit power control configuration for the second uplink transmission based on a close loop power control scheme and/or an open loop power control scheme.

The PROG 740 is assumed to include program instructions that, when executed by the associated DP 710, enable the device 700 to operate in accordance with the embodiments of the present disclosure, as discussed herein with the method 200 or 400. The embodiments herein may be implemented by computer software executable by the DP 710 of the device 700, or by hardware, or by a combination of software and hardware. A combination of the data processor 710 and MEM 720 may form processing means 750 adapted to implement various embodiments of the present disclosure.

The MEM 720 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the device 700, there may be several physically distinct memory modules in the device 700. The DP 710 may be of any type suitable to the local technical environment, and may include one or more of general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing devices. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the present disclosure can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general-purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine-readable medium, which may be any tangible medium that may contain, or store a program for use by or in connection with an instruction execution system, apparatus, or device. The machine-readable medium may be a machine-readable signal medium or a machine-readable storage medium. The machine-readable medium may include but not limited to an electronic, magnetic, optical, electromagnetic, infrared, or semiconductor system, apparatus, or device, or any suitable combination of the foregoing.

More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this disclosure, the device may be implemented in the general context of computer system-executable instructions, such as program modules, being executed by a computer system. Generally, program modules may include routines, programs, objects, components, logic, data structures, and so on that perform particular tasks or implement particular abstract data types. The device may be practiced in distributed cloud computing environments where tasks are performed by remote processing devices that are linked through a communications network. In a distributed cloud computing environment, program modules may be located in both local and remote computer system storage media including memory storage devices.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method in a terminal device, comprising:
    determining whether a first transmit power control configuration based on a first uplink transmission is outdated when a second uplink transmission is scheduled using an uplink grant by a network device, wherein determining whether the first transmit power control configuration is outdated comprises:
        initiating a first timer with a preconfigured value when the first uplink transmission is transmitted; and
        determining that the first transmit power configuration is outdated when the first timer expires before the second uplink transmission is scheduled;
    restarting the first timer when the second uplink transmission is scheduled before the first timer expires; and
    in response to determining whether the first transmit power configuration is outdated, determining to perform power control according to a second transmit power control configuration for the second uplink transmission based on a power control scheme, wherein the second transmit power control configuration is determined based on a close loop power control scheme when the first transmit power control configuration is not outdated, and the second transmit power control configuration is determined based on an open loop power control scheme when the first transmit power control configuration is outdated.

2. The method according to claim 1, wherein the close loop power control scheme comprises that the second transmit power control configuration is determined based on a transmit power control command in the uplink grant from the network device; and
    the open loop power control scheme comprises that the second transmit power control configuration is determined based on a predetermined parameter of the terminal device.

3. The method according to claim 1, wherein the method further comprises:

receiving a first indication from the network device for indicating a close loop power control scheme to be applied or an open loop power control scheme to be applied; and determining that the first transmit power control configuration is outdated according to the first indication.

4. The method according to claim 3, wherein a second timer with a preconfigured value is initiated by the network device when the first uplink transmission is received, and the first indication in the uplink grant is transmitted by the network device if the second timer expires when the second uplink transmission is scheduled.

5. The method according to claim 3, wherein the first indication is transmitted via downlink control information; and a transmit power control command is comprised in the downlink control information when the first indication is used to indicate that the close loop power control scheme is to be applied.

6. The method according to claim 1, wherein the method further comprises:

receiving a relative transmit power control command or an absolute transmit power command, and a second indication for indicating the relative transmit power control command is transmitted or the absolute transmit power command is transmitted.

7. The method according to claim 6, wherein the second indication is transmitted via downlink control information; and the relative transmit power control command or the absolute transmit power control command is comprised in the downlink control information.

8. The method according to claim 1, wherein the method further comprises:

receiving a configuration information for configuring a power control scheme.

9. The method according to claim 8, wherein the configuration information is transmitted via a radio resource control (RRC) signaling or a media access control (MAC) control element (CE).

10. The method according to claim 8, wherein the power control scheme comprises one of the following:

a scheme in which accumulation of transmit power control configuration is applied;

a scheme in which accumulation of transmit power control configuration is not applied;

a scheme in which the close loop power control scheme and the open loop power control scheme is conditionally switched;

a scheme in which a maximum value is applied based on the close loop power control scheme and the open loop power control scheme;

a scheme in which a factor is applied based on the close loop power control scheme and the open loop power control scheme; and a scheme in which a relative transmit power control command or an absolute transmit power command is conditionally switched.

11. A computer program product being comprising a non-transitory computer readable storage medium and including instructions which, when executed on a processor use the terminal device to perform a method for determining power control configuration according to claim 1.

12. A method in a terminal device, comprising:

determining whether a first transmit power control configuration based on a first uplink transmission is outdated when a second uplink transmission is scheduled using an uplink grant by a network device; and determining to perform power control according to a second transmit power control configuration for the second uplink transmission based on a power control scheme, wherein the second transmit power control configuration for the second uplink transmission is determined based on the following formula, $$f_c(i) = \max(f_c(i-1) + tpc \cdot \text{step}, \Delta)$$

where, $f_c(i)$ denotes the second transmit power control configuration for the second uplink transmission, $f_c(i-1)$ denotes accumulation of transmit power control configuration by the last uplink transmission, tpc denotes a transmit power control command from the network device in the close loop power control scheme, step denotes a configured power control step size, $\Delta$ denotes a predetermined parameter of the terminal device in the open loop power control scheme, or wherein the second transmit power control configuration for the second uplink transmission is determined based on the following formula, $$f_c(i) = \max(tpc \cdot \text{step}, \Delta)$$

where, $f_c(i)$ denotes the second transmit power control configuration for the second uplink transmission, tpc denotes a transmit power control command from the network device in the close loop power control scheme, step denotes a configured power control step size, A denotes a predetermined parameter of the terminal device in the open loop power control scheme, or wherein the second transmit power control configuration for the second uplink transmission is determined based on the following formula, $$f_c(i) = \varepsilon \cdot (f_c(i-1) + tpc \cdot \text{step}) + (1-\varepsilon) \cdot \Delta$$

where, $f_c(i)$ denotes the second transmit power control configuration for the second uplink transmission, $f_c(i-1)$ denotes accumulation of transmit power control configuration by the last uplink transmission, tpc denotes a transmit power control command from the network device in the close loop power control scheme, step denotes a configured power control step size, A denotes a predetermined parameter of the terminal device in the open loop power control scheme, E denotes a factor and $0 \le \varepsilon \le 1$, or wherein the second transmit power control configuration for the second uplink transmission is determined based on the following formula, $$f_c(i) = \varepsilon \cdot (tpc \cdot \text{step}) + (1-\varepsilon) \cdot \Delta$$

where, $f_c(i)$ denotes the second transmit power control configuration for the second uplink transmission, tpc denotes a transmit power control command from the network device in the close loop power control scheme, step denotes a configured power control step size, A denotes a predetermined parameter of the terminal device in the open loop power control scheme, E denotes a factor and $0 \le \varepsilon \le 1$.

13. A terminal device, comprising:

a processor; and memory, wherein the memory containing instructions executable by the processor whereby the terminal device is operative to determine whether a first transmit power control configuration based on a first uplink transmission is outdated when a second uplink transmission is scheduled using an uplink grant by a network device, wherein determining whether the first transmit power control configuration is outdated comprises:
  initiating a first timer with a preconfigured value when the first uplink transmission is transmitted; and
  determining that the first transmit power configuration is outdated when the first timer expires before the second uplink transmission is scheduled;
restart the first timer when the second uplink transmission is scheduled before the first timer expires; and
in response to determining whether the first transmit power configuration is outdated, determine a second transmit power control configuration for the second uplink transmission based on a power control scheme, wherein the second transmit power control configuration is determined based on a close loop power control scheme when the first transmit power control configuration is not outdated, and the second transmit power control configuration is determined based on an open loop power control scheme when the first transmit power control configuration is outdated.

* * * * *